(12) United States Patent
O'Reilly

(10) Patent No.: US 10,010,212 B2
(45) Date of Patent: Jul. 3, 2018

(54) COOKING ACCESSORY DEVICE AND METHOD

(71) Applicant: Cheryl A O'Reilly, Mount Prospect, IL (US)

(72) Inventor: Cheryl A O'Reilly, Mount Prospect, IL (US)

(73) Assignee: Cheryl A. O'Reilly, Mount Prospect, IL (US)

( * ) Notice: Subject to any disclaimer, the term of this patent is extended or adjusted under 35 U.S.C. 154(b) by 0 days.

(21) Appl. No.: 15/429,141

(22) Filed: Feb. 9, 2017

(65) Prior Publication Data

US 2017/0340164 A1    Nov. 30, 2017

Related U.S. Application Data

(60) Provisional application No. 62/342,934, filed on May 28, 2016.

(51) Int. Cl.
*A47J 36/00* (2006.01)
*A47J 36/02* (2006.01)

(52) U.S. Cl.
CPC ............... *A47J 36/00* (2013.01); *A47J 36/02* (2013.01)

(58) Field of Classification Search
CPC .................................. A47J 36/00; A47J 36/02
USPC ....................................................... 220/573.4
See application file for complete search history.

(56) References Cited

U.S. PATENT DOCUMENTS

| 100,863 A * | 3/1870 | Corbett ................... A47J 27/10 126/377.1 |
|---|---|---|
| 3,946,893 A | 3/1976 | Bowersmith |
| 6,698,336 B1 | 3/2004 | Siegel et al. |
| 7,478,588 B2 | 1/2009 | Miller et al. |
| 8,534,188 B1 | 9/2013 | Winfield |
| 8,925,446 B2 | 1/2015 | McPheron |
| 2008/0060530 A1 | 3/2008 | Tetreault et al. |
| 2008/0095908 A1 * | 4/2008 | Vendl ..................... A21B 3/138 426/549 |
| 2015/0118370 A1 * | 4/2015 | Johnson .................... A23L 5/15 426/243 |

\* cited by examiner

*Primary Examiner* — Stephen Castellano

(57) ABSTRACT

A cooking accessory for a springform pan includes a reusable, expandable sleeve, with a demarcation cooking bath fill line. The cooking accessory for a springform pan may be useful for preventing liquid from a cooking bath from entering between the removable bottom and the clasped collar of a springform pan.

2 Claims, 5 Drawing Sheets

COOKING ACCESSORY DEVICE AND METHOD

CROSS-REFERENCE TO RELATED APPLICATION

The present application is related to and claims priority to U.S. Provisional Patent Application No. 62/342,934 filed 28 May 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

FIELD OF THE INVENTION

The present invention relates generally to the field of cooking utensils and more specifically relates to a cooking accessory for a springform pan.

DESCRIPTION OF RELATED ART

Cheesecakes are often baked in a springform pan in a water bath, in order to ensure a proper texture and consistency. Currently, aluminum foil is used to seal the interface between the bottom and sides of the springform pan. The current tactic of wrapping aluminum foil around the bottom and sides of the spring-form pan can result in tears in the foil, allowing water to seep into the pan and contaminate the cheesecake. If contaminated, the cake can be ruined. Further, the aluminum foil can only be used once, making the use of aluminum foil unfriendly to the environment, and a waste of money. Some people may forgo a water bath for baking their cheesecake; however, this method produces a cheesecake with a less creamy texture and may increase surface cracking during baking. A suitable solution is desired.

U.S. Pat. No. 8,925,446 to McPheron ("McPheron") relates to a baking apparatus. The described baking apparatus includes a method for preparing a baked good according to an exemplary aspect of the present disclosure includes, among other things, nesting a pan within an elastomeric sleeve and submerging the nested pan and elastomeric sleeve at least partially into a water bath.

Unlike McPheron, the present disclosure has a wrap of a unique structure that is different than the cited patent. The structure of McPheron includes both a baking pan and an elastomeric outer sleeve. The elastomeric sleeve is configured to include a protrusion that is configured to correspond to the shape of the clasp on the outer wall of a spring form pan. The elastomeric sleeve also includes a lip. The elastomeric sleeve further includes lifting handles that extend from a sidewall for transferring the elastomeric sleeve to and from a water bath. In addition, the cited patent illustrates uses for a plurality of pans having a variety of shapes.

U.S. Pat. No. 6,698,336 to Siegel, et al., ("Siegel") relates to a baking dish. The described baking dish includes a generally shallow platter made of ceramic material suitable to withstand a baking environment and having a baking surface defining a supporting plane on which a baked product can be made. A substantially upright continuous wall in the form of a silicone ring generally conforming to the shape of the baking surface is provided that has a height dimension when supported on the baking surfaces relative to the supporting plane to define a generally cylindrical space for receiving and containing a food product to be baked. The platter and silicone ring have substantially conforming peripheries. A laterally extending bead or a protuberance extends about the periphery of the platter and a deformable engaging member in the form a peripheral lip is provided about the periphery of the ring for removably attaching the ring to the platter about the periphery and for providing a generally sealed connection at the mating surfaces of the platter and wall of the ring.

Unlike Siegel, the present disclosure has a wrap of a unique structure that is different than the cited patent. The structure of Siegel includes a shallow platter made of ceramic materials with a substantially upright continuous wall in the form of a silicone ring. The silicone ring is structured to conform to the shape of the baking surface and has a height when coupled with the shallow platter to create a cylindrical space for receiving and containing a food product to be baked. It also includes a deformable engaging member in the form a peripheral lip about the periphery of the ring for removably-attaching the ring to the shallow platter.

U.S. Pat. No. 7,478,588 to Miller, et al., ("Miller") relates to baking apparatuses and methods of use. The described baking apparatuses and methods of use include baking apparatus' adapted for use in baking cakes, custards and other dishes that involve the use of a water bath. In a disclosed embodiment of the invention a baking apparatus is disclosed that includes an inner and outer pan, which may be formed as an integral unit. The outer pan is preferably adapted to receive and hold water and the inner pan is adapted to receive a springform containing a cheesecake batter or other mixture. The side or sides of the inner pan are preferably watertight and prevent leakage of water into the inner pan. The present invention offers the advantage of water bath baking without the problem of water from the bath leaking into the springform that contains the cake batter.

Unlike Miller, the present disclosure has a water barrier of a unique structure that is different than the cited patent. The structure of Miller includes a bottom portion, and an outer barrier extending upwardly from the bottom portion to create an outer perimeter. An inner barrier extends upwardly from the bottom portion, with the inner barrier disposed within the perimeter. The inner barrier cooperates with the outer barrier and the bottom portion to form a substantially watertight reservoir. In addition, the cited patent includes a food item-receiving member disposed within the interior portion.

U.S. Pat. No. 8,534,188 to Winfield ("Winfield") relates to a baking apparatus. The described baking apparatus includes a cheesecake pan system having a bottom plate, a pan rim having a side wall and a hollow center, a lip on an inner surface, the bottom plate temporarily rests atop the lip, a water base having a bottom surface and a side wall that together form an enclosure for holding water, the side wall has a top and bottom edge, a locking means allow the water base and the pan rim to engage each other, a vapor hole in the side wall, a vacuum mount base removably attached to the bottom edge of the side wall a distance below the bottom surface of the water base, the bottom surface, the side wall, and the vacuum mount base together form a bottom cavity, and a vacuum locking means to secure the vacuum mount base to the water base.

Unlike Winfield, the present disclosure has a water barrier of a unique structure that is different than the cited patent. The structure of Winfield includes a bottom plate, a pan rim, a water base, a first half locking means, a vapor hole, a vacuum mount base, a vacuum locking means, a drain valve, and a cap. Further, Winfield is configured to have a removable bottom pan for holding water with the water base and the pan rim able engage each other via a locking mechanism.

U.S. Pat. No. 3,946,893 to Bowersmith ("Bowersmith") relates to a baking apparatus. The described baking apparatus includes an inner cake pan that is removably receivable in an outer pan whose side walls are spaced from the side walls of the inner pan for providing a water receiving space surrounding the inner pan side walls for insulating these walls from the oven heat during the baking of the cake. Novel locking means secures the two pans together so that the bottom of the inner pan contacts the bottom of the outer pan and, therefore, the inner pan bottom will be heated more rapidly than its side walls which are kept at a lower temperature than the bottom because of the insulating layer of water encompassing the inner pan side walls. Also, the releasing of the locking means at the end of the cake baking period will cause the water in the outer pan to float the inner pan and raise it for ready removal from the outer pan.

Unlike Bowersmith, the present disclosure has a baking apparatus of a unique structure that is different than the cited patent. The structure of Bowersmith includes a two pan cake baking utensil including an outer pan for holding water, an inner pan for holding cake batter which is insertable into the outer pan such that the bottom of the inner pan contacts the bottom of the outer pan. The cited patent also includes lifting handles and a catch to hold the bottom of the inner pan in contact with the bottom of the outer pan.

U.S. Pub. No. 2008/0060530 to Tetreault, et al. ("Tetreault"), relates to bakeware. The described bakeware includes bakeware for food products providing flexibility for de-molding a food product while providing sufficient rigidity for various baking uses. The bakeware can comprise one or more flexible receptacles for receiving food products in which the one or more receptacles have one or more side walls extending to a flexible rim portion and a plurality of handle portions attached to the flexible rim portion. Each handle portion can include at least one rigid insert adapted to maintain the shape of the bakeware.

Unlike Tetreault, the present disclosure has bakeware of a unique structure that is different than the cited patent. The structure of Tetreault includes one or more flexible receptacles for receiving food products, a plurality of handle portions attached to the flexible rim portion, with both the receptacles and the handle portions being formed from silicone. The handle portions in the cited patent may include at least one rigid insert, which may be adapted to maintain the shape of the bakeware during use.

BRIEF SUMMARY OF THE INVENTION

In view of the foregoing disadvantages inherent in the known food and baking apparatus art, the present disclosure provides a novel easy way to bake a cheesecake in a water bath using the cheesecake wrap. The general purpose of the present disclosure, which will be described subsequently in greater detail, is to provide an easy bath cheesecake wrap.

A cooking accessory is disclosed herein. The cooking accessory includes an expandable sleeve configured to removably-receive the springform pan and prevent liquid from a cooking bath from entering between the removable bottom and the clasped collar, the expandable sleeve having a concave shape including base and a slightly corrugated-shaped wall extending from and encircling the base, and a measurement demarcation line about the slightly corrugated-shaped wall, the measurement demarcation line configured to visibly indicate a predefined liquid level of the cooking bath while the springform pan is received and seated in the expandable sleeve.

According to another embodiment, a cooking accessory is also disclosed herein. The cooking accessory includes placing an expandable sleeve about a springform pan, filling the springform pan with batter, placing the expandable sleeve and the springform pan within a vessel used for a cooking bath, filling the vessel used for the cooking bath with a quantity of hot water sufficient to reach a measurement demarcation line on the expandable sleeve, placing the expandable sleeve, the springform pan, and the vessel used for the cooking bath in an oven; removing the expandable sleeve and the vessel used for the cooking bath from the oven, removing the expandable sleeve and the springform pan from the vessel used for a cooking bath, and removing the expandable sleeve from the springform pan. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an easy bath cheesecake wrap, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a food and baking apparatus and more particularly to an easy bath cheesecake wrap as used to improve a cooking accessory.

Generally, the best way to bake a cheesecake (or other egg-based foods e.g. custard or bread pudding) is in a water bath after wrapping the springform pan in aluminum foil. If for any reason, the aluminum foil seal has small tears or leaks and doesn't hold, the cheesecake is ruined due to the water leaking into the cheesecake from the water bath. The easy bath cheesecake wrap provides bakers with a reusable silicone wrap for a springform pan designed to replace aluminum foil when baking the cake in a water bath. It eliminates the worry of water seeping into a spring-form pan at the lower edge, where the bottom and sides meet, when a cheesecake is being baked in a water bath. The device replaces the inefficient and inconvenient tactic of wrapping disposable aluminum foil around the bottom, and up the sides, of the pan. It ensures a cheesecake can be baked all the way through as the water allows a gentle uniform heat that does not allow the egg protein contained in the cheesecake/custard/bread pudding batter to exceed temperatures that cause surface cracking and allows the cake to be of a more desirable creamy texture, and it is reusable.

Because the wrap is made from reusable silicone, the device is stretchy and elastic, making it easy to put on and remove from the springform pan. The sides of the wrap slope outwards to assist in putting it on the springform pan. The wrap may be dimensioned to be used with standard springform pans having diameters of 8 inches, 9 inches and 9.5 inches. For example, the inside diameter of the wrap may be just over 9 inches, and may stretch to accommodate pans having a diameter of 9.5 inches. An indicator, or fill line, such as a demarcation line may be used to indicate the proper amount of water to add to the water bath. The wrap can be sturdy enough or otherwise sufficiently rigid that its sides can stand up without supplemental support. Lastly, the wrap may be made of materials able to withstand multiple exposures to the heat and time required for baking items in a water bath.

Figure 1:
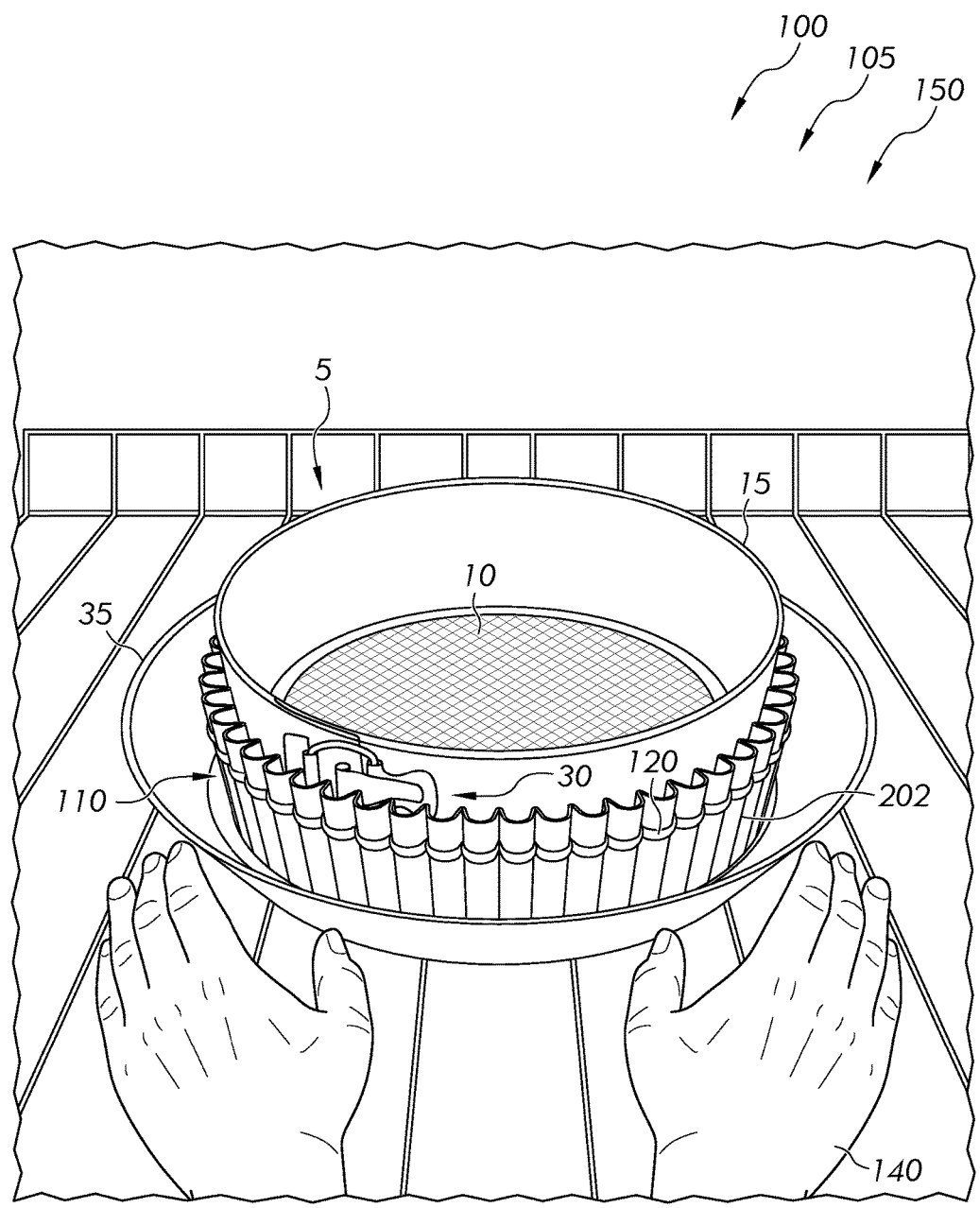
FIG. 1 is a perspective view of the cooking accessory coupled with a springform pan during an 'in-use' condition, according to an embodiment of the disclosure.
Figure 1:
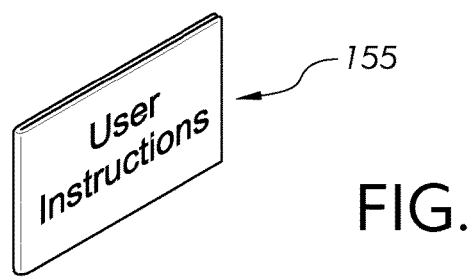

Referring now more specifically to the drawings by numerals of reference, there is shown in FIGS. 1-4, various views of a cooking accessory 100. FIG. 1 shows a cooking accessory 100 during an 'in-use' condition 150, according to an embodiment of the present disclosure. Here, the cooking accessory 100 may be beneficial for use by a user 140 to be a cooking accessory 100 for a springform pan 5.

The springform pan 5 may have a removable bottom 10 that may be held in place by a clasped collar 15, which wraps around the removable bottom 10 and forms the sides of the springform pan 5. The springform pan 5 and cooking accessory 100 may be joined together for use, with the cooking accessory 100 serving as a water barrier when the springform pan 5 and cooking accessory 100 are placed in a water bath, as is sometimes used by bakers.

As illustrated, the cooking accessory 100 may include an expandable sleeve 110, which may be configured to removably-receive the springform pan 5 and may also have a demarcation line 120. In addition, the uppermost portion of the side wall arising gradually from the base may have a slightly corrugated appearance 202 configured as such to receive and physically interface with the springform pan 5, thereby allowing thermal conduction of heat to the springform pan 5 while seated in the expandable sleeve 110. The corrugated-shaped wall 202 may be further configured to thermally interface with the clasped collar 15 of the springform pan 5 while the springform pan 5 is received and seated in the expandable sleeve 110. The corrugated-shaped wall 202 may yet further be configured to flexibly deform about the contours of the clasping mechanism 30 of the clasped collar 15 when the user 140 is engaging, and alternately disengaging, the springform pan 5 with the expandable sleeve 110. For example, as discussed above, this may be achieved by selection of deformable materials such as silicone.

The cooking accessory 100 may be arranged as a kit 105. In particular, the cooking accessory 100 may further include a set of instructions 155. The instructions 155 may detail functional relationships in relation to the structure of the cooking accessory 100 (such that the cooking accessory 100 can be used, maintained, or the like, in a preferred manner). In another embodiment of the present disclosure, the kit 105 may include at least one spatula, a water bath pan with finger-grip holes, the springform pan 5, and the cooking accessory 100.

Figure 2:
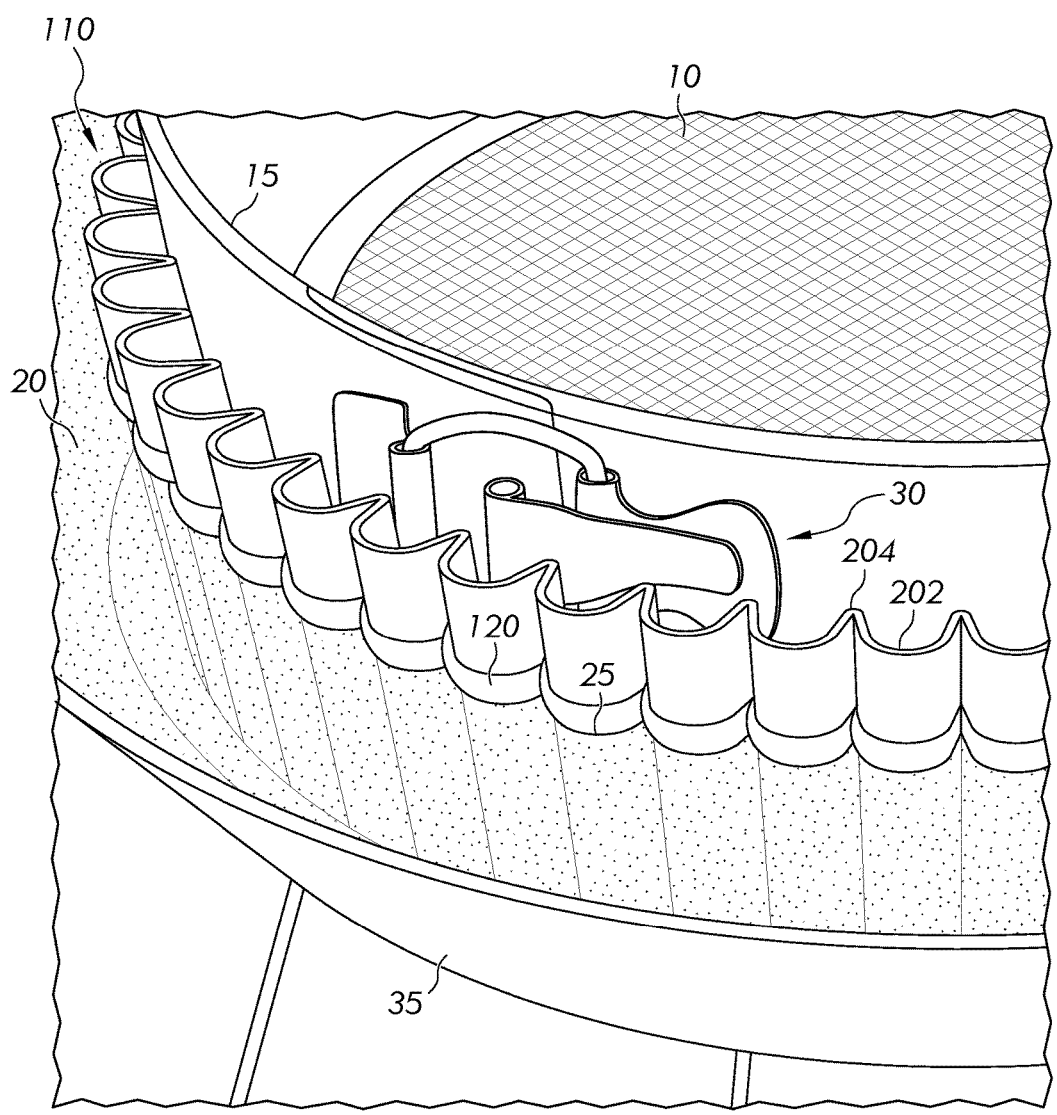
FIG. 2 is a detail perspective view of the cooking accessory of FIG. 1, according to an embodiment of the present disclosure.

FIG. 2 is a detail perspective view of the cooking accessory of FIG. 1, according to an embodiment of the present disclosure. As above, the cooking accessory 100 may include expandable sleeve 110 with a demarcation line 120. Additionally, the expandable sleeve 110 may be configured to act as a water barrier to prevent liquid from a cooking bath 20 from entering between the removable bottom 10 and the clasped collar 15. Should liquid from the cooking bath 20 enter between the removable bottom 10 and the clasped collar 15, the liquid may dilute the cooking batter and unsatisfactorily alter the baked product.

In continuing to refer to the expandable sleeve 110, the expandable sleeve 110 may further have a slightly corrugated wall 202. The slightly corrugated wall 202 will allow elasticity and flexibility to seat the springform pan 5 within the sleeve 110 while still allowing the heated water of the surrounding water bath 35 to be conducted through the silicone material to uniformly bake the cheesecake within the springform pan 5.

In further referring to the slightly corrugated wall 202, the slightly corrugated wall 202 may have a demarcation line 120. The demarcation line 120 may be a raised band, which may be configured to visibly indicate a predefined liquid level 25 for the cooking bath. For example, the demarcation line 120 may circumscribe the outside of the expandable sleeve 110. Further, while the springform pan 5 may be received and seated in the expandable sleeve 110, both are placed in a vessel used for a cooking bath 35, the liquid for the cooking bath 20 may then be added to up to the demarcation line 202, for example, to allow controlled heat transfer between the direct heat of the oven through the cooking bath 35 conducted through the sleeve 110 to the springform pan 5 and its contents.

Figure 3:
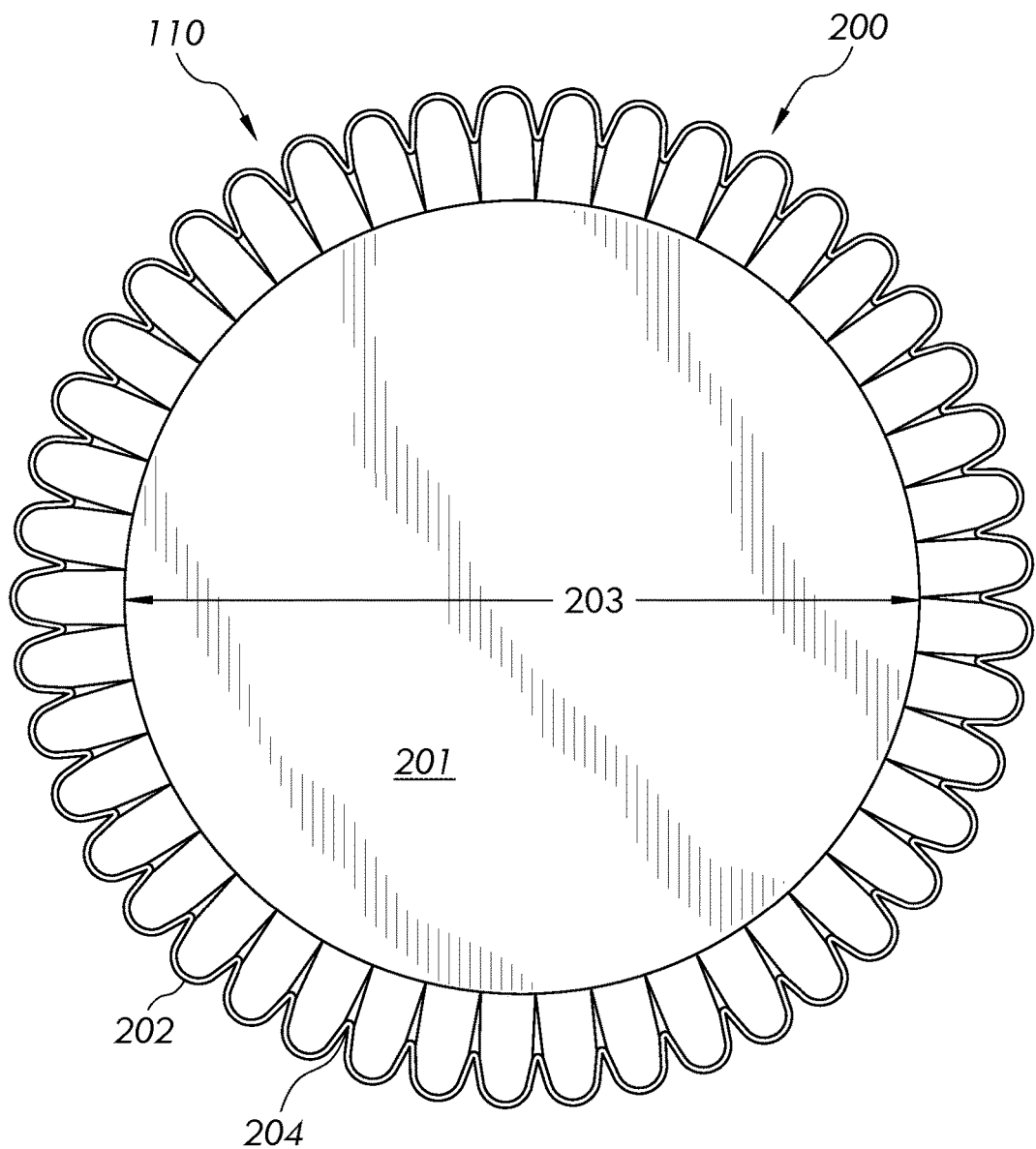
FIG. 3 is a top view of the cooking accessory of FIG. 1 in isolation, according to an embodiment of the present disclosure.

FIG. 3 is a top view of the cooking accessory of FIG. 1 in isolation, according to an embodiment of the present disclosure. As above, the cooking accessory 100 may include the expandable sleeve 110 configured to receive the springform pan 5. Alternately, instead of the springform pan 5, the expandable sleeve 110 may be configured to receive a baking pan of solid construction having at least one side, an interior periphery, and a hollow interior. In alternate configurations of the present invention, baking pans of a plurality of shapes and sizes may be received by the expandable sleeve 110. The baking pans may further include a plurality of individual serving-sized ramekin-style bakeware with contents that may require baking in conjunction with a water bath.

In continuing to refer to the expandable sleeve 110, the expandable sleeve 110 may include a base 201 and a slightly corrugated wall 202. The base 201 of the expandable sleeve 110 may have a substantially flat shape that may be structured and arranged to interface with the removable bottom 10 of the springform pan 5 (FIG. 1). For example, the base 201 of the expandable sleeve 110 may be dimensioned to receive one or more standard sized pans. Further, in dimensioning the base 201, elastic properties of the expandable sleeve 110 may be included such that a "large" standard size is included by moderate stretching. For example, in this embodiment of the present disclosure, the removable bottom 10 of the springform pan 5 may have a diameter of approximately 9 inches, thus the base 201 may also have a diameter 203 of approximately 9 inches. In alternate embodiments of the present disclosure, the removable bottom 10 of the springform pan 5 (FIG. 1) may have an approximate range from 8 inches to 9.5 inches.

In referring now to the slightly corrugated wall 202, the slightly corrugated wall 202 may extend up starting at approximately ½ inches from the base 201 to the upper edge of the side walls at least 2 inches high 202. As noted above, the corrugated, flexible walls 202 allow the heated water 20 from the water bath 35 to be conducted uniformly through the silicone material to bake the cheesecake seated in the springform pan 5 within the sleeve 110.

Figure 4:
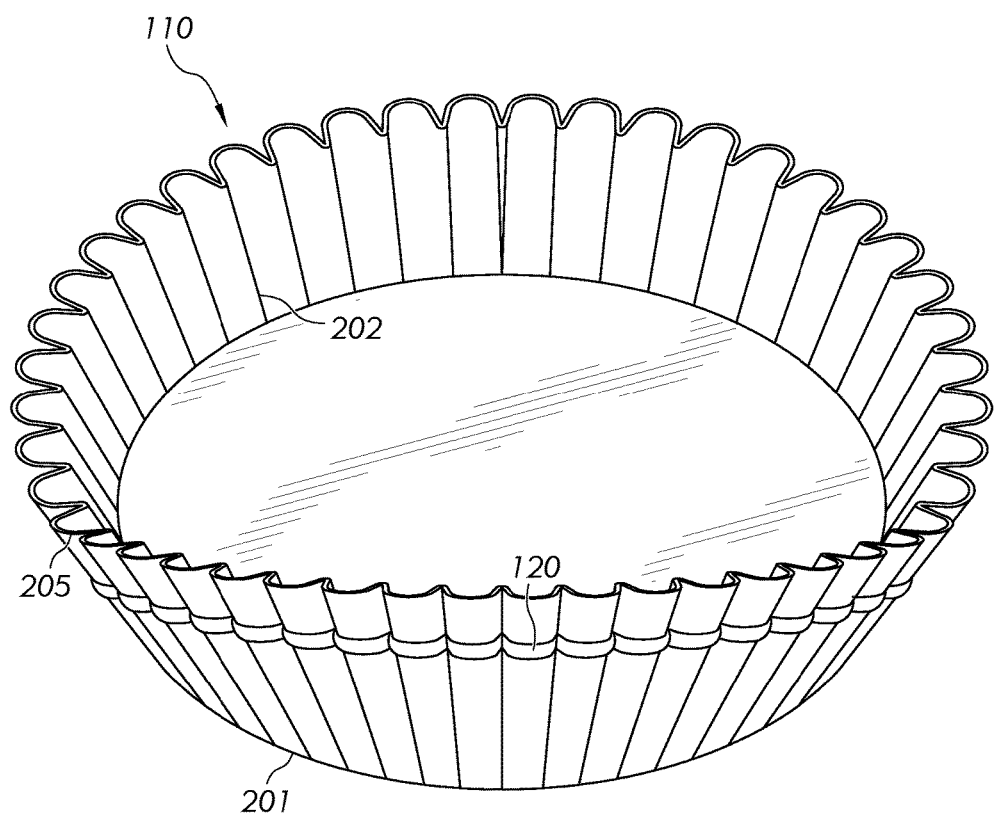
FIG. 4 is a perspective view of the cooking accessory of FIG. 1, according to an embodiment of the present disclosure.

FIG. 4 is a perspective view of the cooking accessory of FIG. 1 in isolation, according to an embodiment of the present disclosure. In referring now to the expandable sleeve 110, the expandable sleeve may have a demarcation line 120 and a slightly corrugated wall 202. As illustrated, the expandable sleeve 110 may have a concave shape 200 at rest and/or when the springform pan 5 is seated inside (FIG. 1). The concave shape may receive the springform pan 5.

The demarcation line 120 may be a raised band about the circumference of the expandable sleeve 110. Further, the demarcation line 120 may be positioned at a distance of approximately 1.25 inches from the lower edge of the base 205 to provide a visible identification for the appropriate amount of liquid to use for a cooking bath 20 (FIG. 2). The corrugated wall 202 may also be tapered inward from the upper edge opposite to the base 205 to the base 201, as shown.

In further referring to the expandable sleeve 110, the expandable sleeve 110 may be of unitary construction. The expandable sleeve 110 may be substantially made of elastomeric materials that may be both deformable and flexible during manipulation by a user 140 (FIG. 1). Further, the unitary construction of the expandable sleeve 110 may have a thickness such that the elastomeric material may be durable and non-tearable. The expandable sleeve 110 may be substantially made of heat-resistant materials. The expandable sleeve 110 may also be substantially made of heat-conductive materials. Further, the expandable sleeve 110 may be substantially made of waterproof materials. In alternate embodiments of the present disclosure, the elastomeric material may be food-grade silicone, and alternately, other materials having heat-resistant, heat-conductive, and waterproof characteristics.

Figure 5:
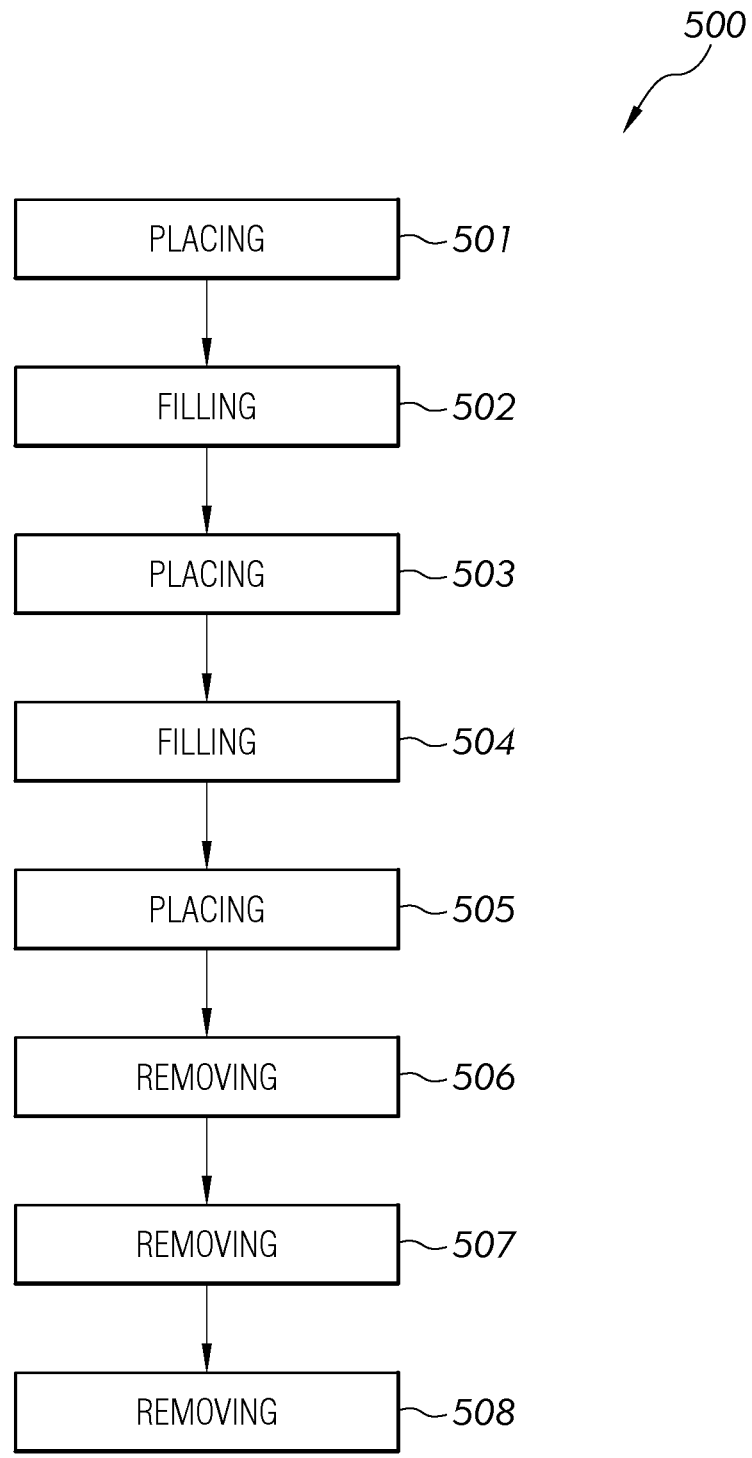
FIG. 5 is a flow diagram illustrating a method of use for the cooking accessory of FIG. 1, according to an embodiment of the present disclosure.

FIG. 5 is a flow diagram illustrating a method of use for the cooking accessory, according to an embodiment of the present disclosure. In particular, the method for the cooking accessory 500 may include one or more components or features of the cooking accessory 100 as described above. As illustrated, the method for the cooking accessory 500 may include the steps of: step one 501, placing an expandable sleeve about a springform pan; step two 502, filling the springform pan with batter; step three 503, placing the expandable sleeve and the springform pan within a vessel used for a cooking bath; step four 504, filling the vessel used for a cooking bath with a quantity of hot water sufficient to reach a demarcation line on the expandable sleeve; step five 505, placing the expandable sleeve, the springform pan, and the vessel used for a cooking bath in an oven; step six 506, removing the expandable sleeve, the springform pan, and the vessel used for a cooking bath from the oven; step seven 507, uncoupling or otherwise removing the expandable sleeve and the springform pan from the vessel used for a cooking bath; and step eight 508, removing the expandable sleeve from the springform pan.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the cooking accessory (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The invention claimed is:

1. A cooking accessory comprising:
   a springform pan and an expandable sleeve, the springform pan having a removable bottom that is held in place by a clasped collar forming its sides, the expandable sleeve configured to removably receive the springform pan and prevent liquid from a cooking bath from entering between the removable bottom and the clasped collar;
   said expandable sleeve having a concave shape including a base, an corrugated-shaped wall extending from and encircling said base; and
   a demarcation line about said corrugated-shaped wall, the demarcation line configured to visibly indicate a predefined liquid level of the cooking bath while the springform pan is received and seated in said expandable sleeve;
   wherein said expandable sleeve is of unitary construction;
   wherein said expandable sleeve is substantially made of heat-resistant materials;
   wherein said expandable sleeve is substantially made of heat-conductive materials;
   wherein said expandable sleeve is substantially made of waterproof materials;
   wherein said expandable sleeve is substantially made of elastomeric materials that are deformable and flexible during manipulation by a user;
   wherein said corrugated-shaped wall is configured to thermally interface with the clasped collar of the springform pan while the springform pan is received and seated in said expandable sleeve;
   wherein said corrugated-shaped wall is configured to flexibly deform about contours of a clasping mechanism of the sprung collar;

wherein the base of said expandable sleeve has a substantially flat shape that is structured and arranged to interface with the removable bottom of the springform pan;

wherein the removable bottom of the springform pan has a diameter of approximately 9 inches;

wherein said corrugated-shaped wall of said expandable sleeve extends from its base by at least 2 inches;

wherein said corrugated-shaped wall is structured and arranged with a water-containment vessel to contain a heated-water-bath there between such that heat energy is transferable from the heated-water-bath through the springform pan to contents of the springform pan while the springform pan is seated in said expandable sleeve;

wherein said expandable sleeve has a thickness such that the elastomeric material is tear-resistant;

wherein said demarcation line is a raised band about a circumference of said expandable sleeve;

wherein the corrugated-shaped wall of said expandable sleeve includes an upper edge opposite to the base, and said demarcation line is positioned at a distance of approximately 1.25 inches from said base; and wherein the corrugated-shaped wall is tapered inward from the upper edge opposite to said base.

2. The cooking accessory of claim 1, further comprising a set of instructions.

* * * * *